J. WEBER.
DISK CUTTING MACHINE.
APPLICATION FILED NOV. 4, 1915.
1,179,482.
Patented Apr. 18, 1916.
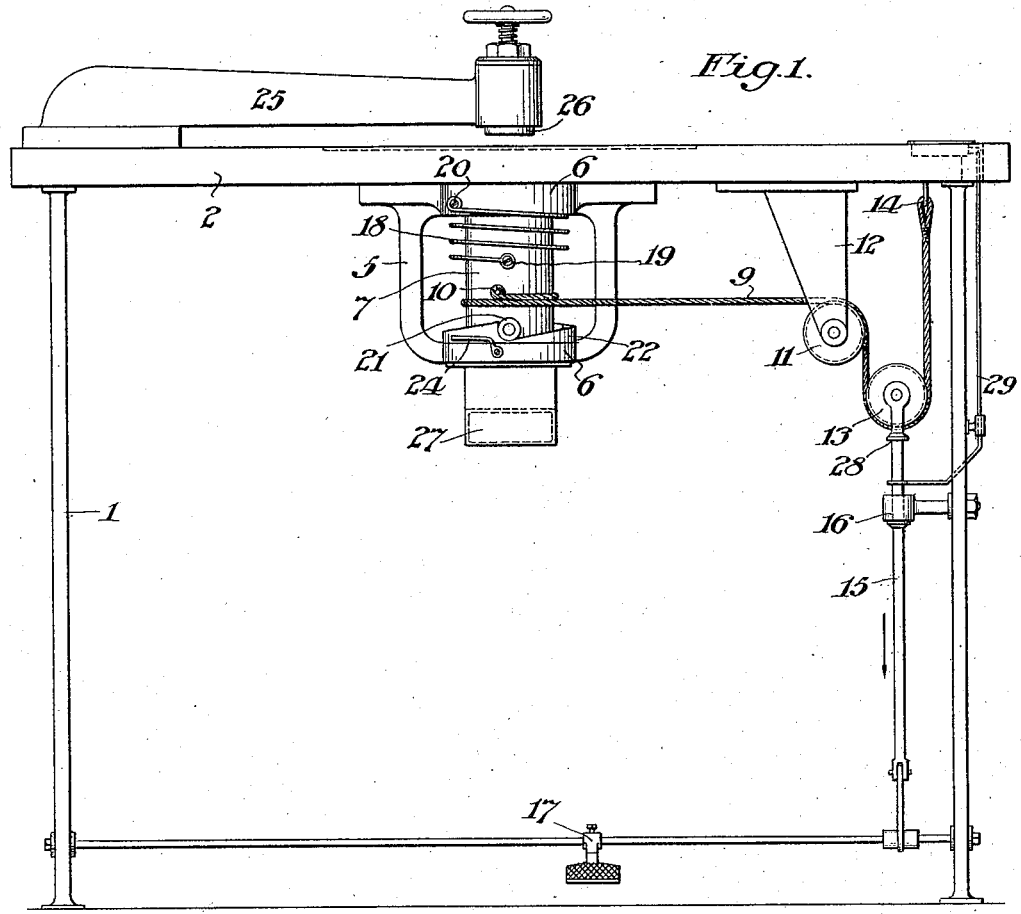
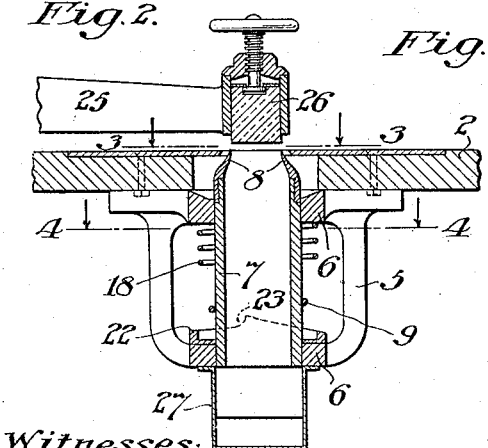
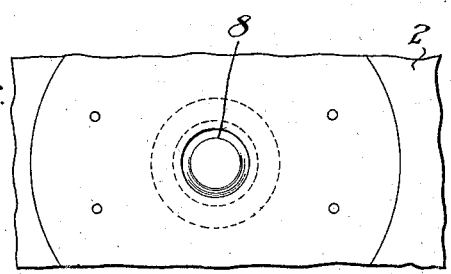
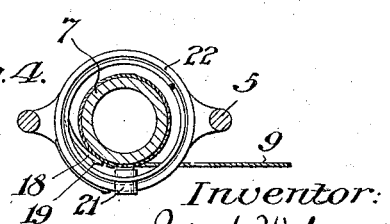
Witnesses:
Henry S. Callaway
Inventor:
Joseph Weber
By John Dolman
Attorney.

UNITED STATES PATENT OFFICE.

JOSEPH WEBER, OF PHILADELPHIA, PENNSYLVANIA.

DISK-CUTTING MACHINE.

1,179,482.

Specification of Letters Patent.

Patented Apr. 18, 1916.

Application filed November 4, 1915. Serial No. 59,502.

*To all whom it may concern:*

Be it known that I, JOSEPH WEBER, a subject of Germany, residing at Philadelphia, in the county of Philadelphia and State of Pennsylvania, have invented new and useful Improvements in Disk-Cutting Machines, of which the following is a specification.

My invention relates to improvements in machines for cutting principally the "host" or thin disks or wafers of bread for use in Roman Catholic churches, but may be used for cutting thin disks of other material, and consists principally of a rotating and reciprocating cylindrical cutter positioned vertically under the cutting block, and in certain details of construction more fully described in the following specification and specifically pointed out in the claims.

Referring to the drawing, forming part of this specification, Figure 1 represents an elevation of my improved machine, Fig. 2 is a vertical section of the cutter, cutting block and adjacent parts, Fig. 3 is a plan view of a portion of the machine as on line 3, 3, of Fig. 2, and Fig. 4 is a sectional view on line 4, 4, of Fig. 2.

The frame, 1, of the machine is provided with a flat table top, 2, to the under side of which is secured a bracket, 5, formed with annular bearings 6, 6, in which a cylindrical cutter, 7, is adapted to rotate and reciprocate. The cutter, 7, is preferably provided with a detachable cutter head, 8, which may be readily removed for sharpening or renewal.

The cutter, 7, is rotated by a cord, 9 secured to its outer surface at 10, and passing around the cutter as shown in Fig. 1. This cord, 9, then runs over a pulley, 11, mounted in a bracket 12, secured to the underside of the table, 2, and then under a second pulley, 13, and secured at 14, to the table, 2.

The pulley, 13, is mounted on the upper end of a reciprocating rod, 15, working in a bearing, 16, and arranged to be moved vertically downward by a suitable treadle, 17.

A spiral spring, 18, encircling the cylinder, 7, is secured to the same at 19, and to the bracket, 5, at 20, and serves to rotate the cylindrical cutter, 7, back to its normal position when the tension on the cord, 9, is released. This spring, 18, also assists gravity in forcing the cutter, 7, down again after cutting.

A roller, 21, is secured to the side of the cylinder, 7, and adapted to ride up the inclined edge of a ring, 22, which encircles the cylindrical cutter, 7, during a half turn of said cutter, and then to drop into the cut out, 23, in one or the other side of said ring, 22, being carried down by gravity and the force of the spring, 18. This quick return after cutting, insuring rapid and clean work. Upon release of the tension on the cord, 9, the cylinder, 7, rotating back to its normal position, carries this ring, 22, with it. A friction spring, 24, is attached to the bracket 5, and pressing against the side of the ring, 22, acts as a brake to prevent the turning of the ring, 22, when the roller, 21, is mounting up the incline as described.

An arm, 25, mounted on the table, 2, carries a wooden cutting block, 26, suitably mounted therein as shown, positioned centrally over the cutting edge, 8, and adapted to receive the thrust thereof. The height of the cutting block, 26 above the table, 2, is adjustable as shown, and it should be adjusted so that the sharp edge, 8, shall press against it with just enough force to insure smooth cutting.

A chute or basket, 27 of any convenient form is provided to receive the cut disks or wafers from the cylindrical cutter, the inside of which remains entirely open and unobstructed for this purpose.

In use the thin sheet of bread, (or other material,) lying flat upon the top of the table, 2, is brought between the cutting block, 26 and the cutter head, 8. The treadle, 17 is depressed, pulling down the rod, 15 and pulley, 13, pulling on the cord, 9, which by unwinding from the cutter, 7, rotates the same, and the roller, 21, riding up the inclined edge of the ring, 22, forces the cutter, 7, upward at the same time it is rotating, thus cutting out the disk of bread which falls through the inside of the cylindrical cutter into the basket or chute, 27. Just as the disk is cut, the roller, 21, having reached the highest point of the ring, 22, drops into the cut out, 23, carrying of course, the cutter, 7, with it. Pressure on the treadle, 17, being now released, the spiral spring, 18, rotates the cutter in the opposite direction carrying all the parts back to their normal position, and by pressure of the roller, 21, against the side of the cut out, 23, the ring, 22, is carried a half turn backward in position for a new cut. The extent of the rotation of the cutter may be regulated by adjusting the height of the bearing, 16, against which the shoulder, 28 on the rod, 15, is adapted to contact.

29, represents a counting device which may be of any desired character and forms no part of my invention.

Having as above fully described my invention, in the best form known to me, I claim—

1. In a disk cutting machine, a cutting block, a hollow cylindrical cutter positioned vertically under the block with the cutting edge upward, means for rotating and moving the cutter upward against the block and causing it to drop immediately after cutting, an unobstructed way through the center of the cutter for the passage of the cut disk and a chute or receptacle beneath the hollow cutter to receive the cut disk.

2. In a disk cutting machine a block, a hollow cylindrical cutter, means for rotating the same, an inclined ring up which the cutter will slide while rotating, and a cut out in the ring permitting the cutter to drop after cutting.

JOSEPH WEBER.

Witnesses:
HENRY S. CALLAWAY,
JOHN DOLMAN.

Copies of this patent may be obtained for five cents each, by addressing the "Commissioner of Patents, Washington, D. C."